Oct. 17, 1961      C. L. MORSE      3,004,577
SUPPLEMENTAL PNEUMATIC TIRE

Filed Oct. 14, 1959      3 Sheets-Sheet 1

INVENTOR.
CHARLES L. MORSE
BY
Barlow & Barlow

Oct. 17, 1961 C. L. MORSE 3,004,577
SUPPLEMENTAL PNEUMATIC TIRE
Filed Oct. 14, 1959 3 Sheets-Sheet 2
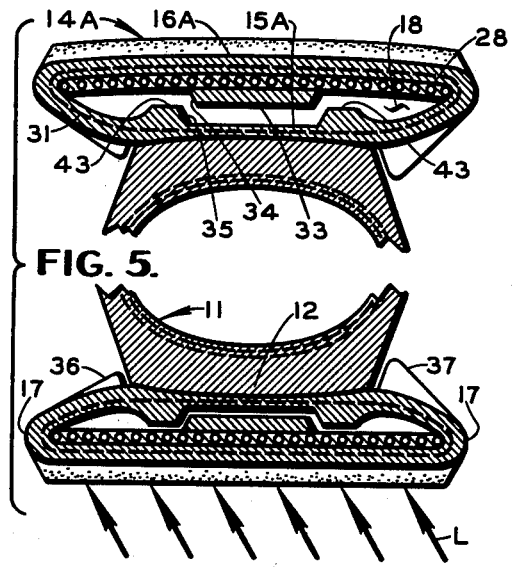
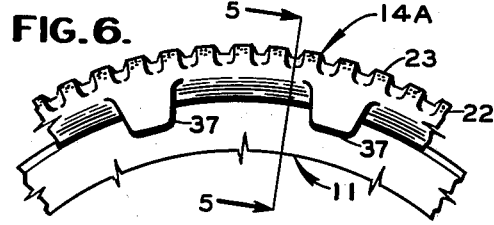
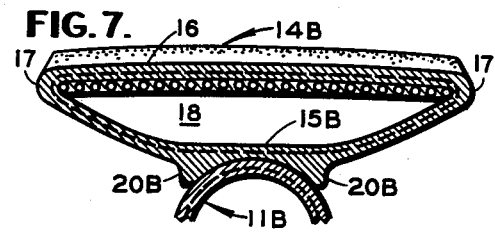
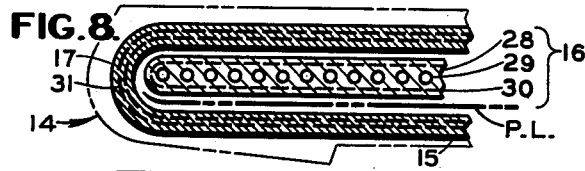
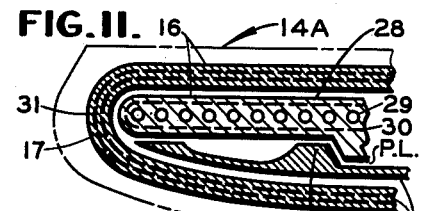
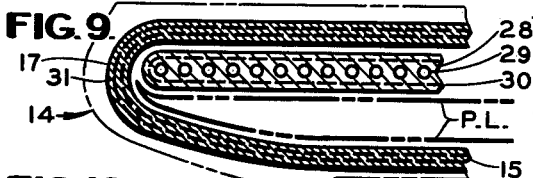
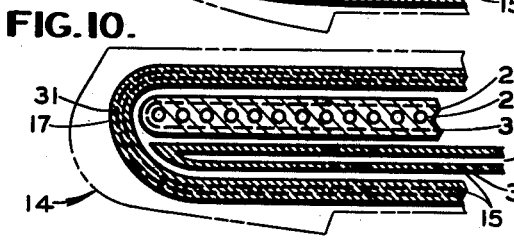
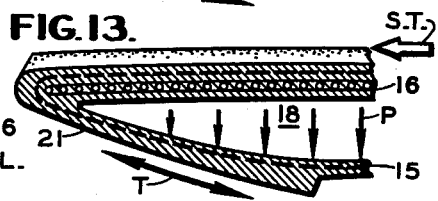
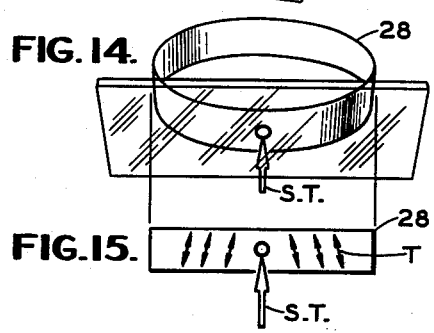
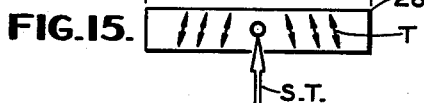
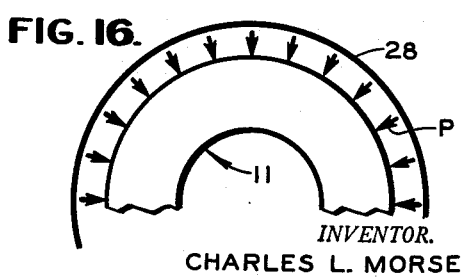
INVENTOR.
CHARLES L. MORSE
BY
Barlow & Barlow Oct. 17, 1961  C. L. MORSE  3,004,577
SUPPLEMENTAL PNEUMATIC TIRE
Filed Oct. 14, 1959  3 Sheets-Sheet 3
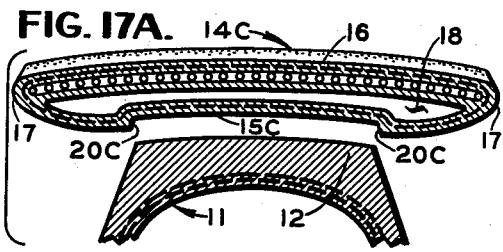
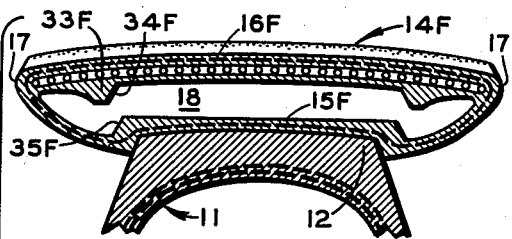
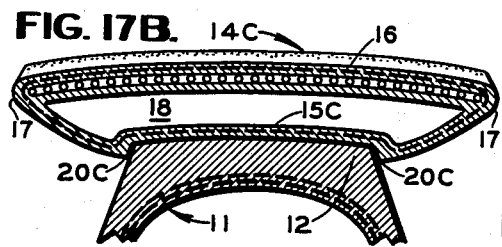
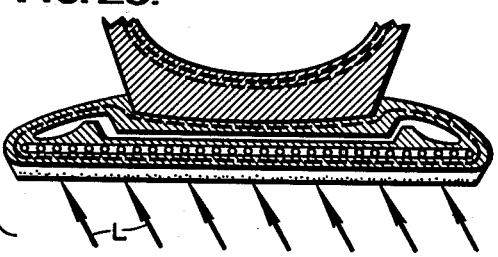
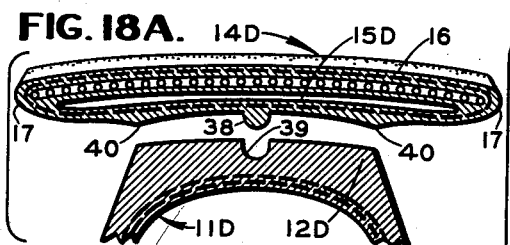
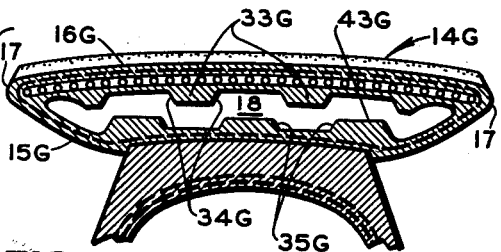
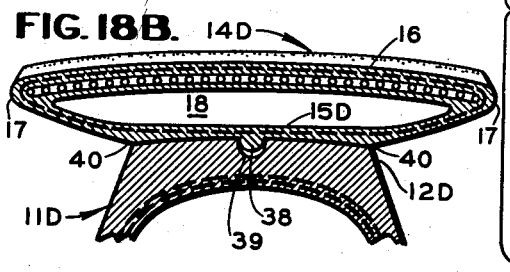
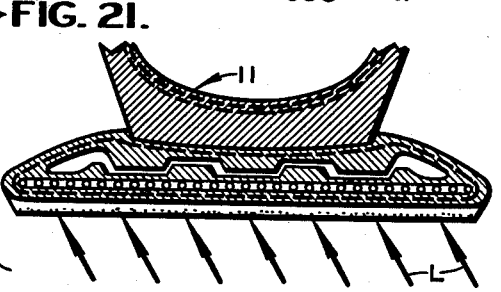
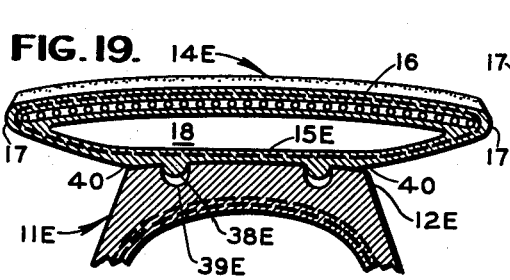
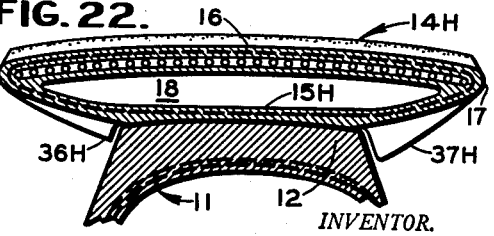
INVENTOR.
CHARLES L. MORSE
BY
Barlow & Barlow

United States Patent Office 3,004,577
Patented Oct. 17, 1961

3,004,577
SUPPLEMENTAL PNEUMATIC TIRE
Charles L. Morse, P.O. Box 156, South Dartmouth, Mass.
Filed Oct. 14, 1959, Ser. No. 846,394
21 Claims. (Cl. 152—175)

This invention relates to improvements in vehicle tires, particularly to a supplemental tread which is adapted to be mounted pneumatically onto a conventional automobile, truck, or airplane tire.

I am aware that supplemental treads, tires, or so-called "shoes" of the above character heretofore have been proposed to be used in lieu of the usual tire chains so as to provide in effect a snow tire. Those with which I am familiar have been fabricated in a manner so as to provide a preformed cavity which is made in cross section complemental to the outer cross sectional configuration of the vehicle tire over which it is placed. These prior shoes are not only very difficult to install, particularly when the vehicle tire on which it is to be positioned is inflated, but require special tools or even machines to install them. These prior shoes generally have an innermost diameter substantially less than the outermost diameter of the conventional tire, and to place the smaller diameter over the larger diameter is well beyond the ability of the average motorist. Therefore, these prior shoes offer no advantage over changing the usual tire to a snow tire or other specialized conventional tire.

An object of the invention is to provide for improvements in the prior supplement tire of the above character.

A more specific object of the invention is to provide a supplement tire of the above character so constructed that when in the deflated relation, sufficient clearance will be had to permit it to be readily slipped on the conventional vehicle tire without the use of tools.

Another object of the invention is to provide a supplemental tire of the above character so constructed that when positioned on a conventional vehicle tire and inflated, the radially-inner wall thereof will deform in cross section into the configuration of the portion of the conventional tire over which it is placed to be firmly held thereon.

Another objection of the invention is to provide a supplemental tire of the above character constructed on the principle of an annular single-wall, contracted bellows or diaphragm, so that after deflation the radially-inner wall will automatically return to the retracted position for easy removal of the tread. This principle of construction may also be described more adequately as one half of a single stage bellows.

Another object of the invention is to provide a supplemental tire of the above character so constructed as to provide a high degree of resistance to side thrust.

Another object of the invention is to provide a supplemental tire of the above character without excessive diameter and still provide for sufficient tread mass for the purpose of use intended.

Still another object of the invention is to provide a supplemental tire of the above character that is relatively easy and inexpensive to manufacture.

With these and other objects in view, the invention consists of certain novel features of construction as will be more fully described and particularly pointed out in the appended claims.

In the accompanying drawings:

FIGURE 5 is a view showing the top and bottom cross sections of a modified supplemental pneumatic tire, the top cross-sectional view showing an enlarged view taken substantially along line 5—5 of FIGURE 6, and the bottom cross sectional view showing normal road loads and side thrust being applied;

FIGURE 6 is a side view of a fragmentary section of a modified supplementary pneumatic tire;

FIGURE 7 is a sectional view of a modified supplemental pneumatic tire for use with narrow, round or streamlined conventional tires;

FIGURE 8 is a fragmentary detached sectional view of the fabric and wire annulus of an uninflated supplemental pneumatic tire showing the construction thereof and the manner in which the fabric plies are wrapped around the reinforcing annulus;

FIGURE 9 is a view similar to that of FIGURE 8 but showing the inflated condition;

FIGURE 10 is a detached sectional view similar to FIGURE 8 but with an added lining or integral "inner tube";

FIGURE 11 is a detached sectional view similar to FIGURE 8 but with an added insert and modified construction;

FIGURE 12 is a schematic force diagram illustrating how the axial compression of the reinforcing annulus resists the tension of the fabric plies;

FIGURE 13 is a fragmentary sectional view showing schematically the force of side thrust, inflationary forces, and tension in the side portions;

FIGURES 14 and 15 are diagrammatic representations illustrating the resistance lines of force to side thrust;

FIGURE 16 is a diagrammatic representation of the inward displacement of the supplementary pneumatic tire as it is inflated;

FIGURES 17A, 17B, 18A, 18B, 19, 20, 21 and 22 are representative cross sectional views showing modified constructions of various supplementary pneumatic tires.

Figure 4:
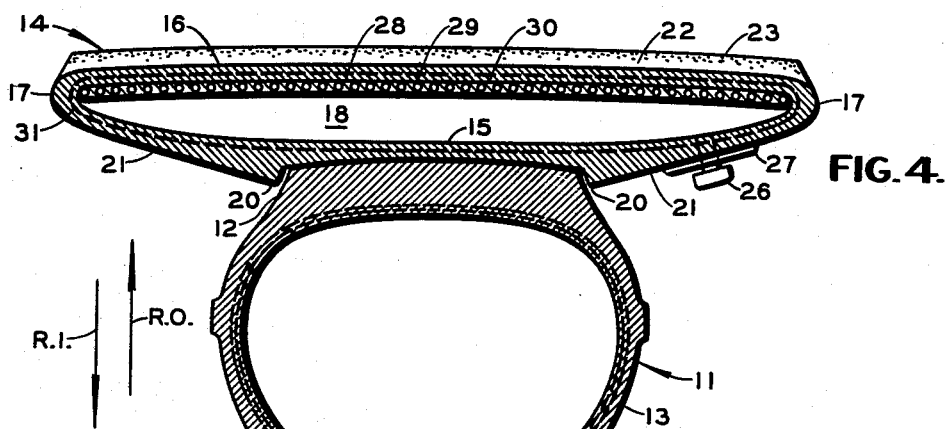
FIGURE 4 is an enlarged sectional view taken substantially along line 4—4 of FIGURE 1.

To prevent confusion when describing various features of the supplementary pneumatic tires, directional arrows are shown adjacent to FIGURE 4. Arrow A indicates axial direction; arrow A.O. indicates axially-outer direction; R.I. and R.O. indicate radially-inner and radially-outer directions respectively.

The supplemental pneumatic tire or shoe of the present invention may be generally described as an inflatable annulus having a higher tread mass and larger print area than the conventional vehicle tire and is adapted to be easily mounted on the existing tires of a vehicle so as to adapt its use to snow, ice, mud sand, or wherever extreme traction and large bearings surfaces are needed. It is comparable to some extent to conventional tire chains but is more dependable in operation, gives greater road clearance, permits higher road speeds, and affords smoother riding on bare pavements.

Additionally, the supplemental pneumatic tire of the present invention may be used as a replacement for a spare tire. When the supplemental tire is constructed with suitably strong annulus reinforcement, a generally circular shape will be retained with the tire in place. Thus, when the supplemental tire is installed over a punctured or flat vehicle tire, the latter is squeezed evenly inward over its entire circumference and will retain a circular shape rather than flatten at point of contact with the road.

In the present invention, the mass of the shoe is distributed and arranged so as to provide when deflated an annulus having a sufficiently large inner diameter to be easily slipped over the vehicle tire on which it is to be mounted, and when inflated, the radially inner wall will move into complemental relation with the vehicle tire, with the lips or abutments adjacent to, or engaging, the side walls of the vehicle tire. Thus, the supplemental shoe is pneumatically held firmly in position.

Figure 1:
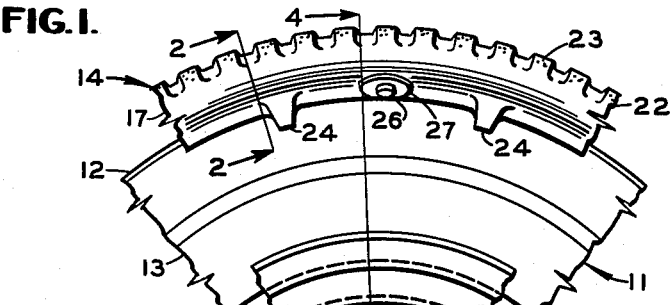
FIGURE 1 is a side view of a fragmentary section of a supplemental tire or shoe embodying my invention and shown pneumatically mounted on a conventional vehicle tire.
Figure 2:
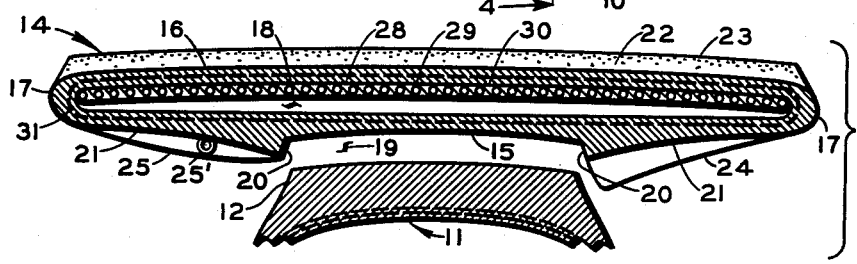
FIGURE 2 is an enlarged sectional view taken substantially along line 2—2 of FIGURE 1, except without inflation.

Referring to FIGURES 1 and 4, 10 designates generally a vehicle rim on which is mounted a conventional tire casing 11 having a usual tread mass indicated at 12 extending into the side walls 13. The casing 11 is to be considered as being in the inflated condition throughout the several figures of the drawings. The supplemental pneumatic tread 14 which is the subject of the present invention hereinafter will be referred to as a shoe or "overtire" for the sake of clarity in distinguishing between it and the usual tire casing 11 on which it is mounted. The overtire is composed principally of a resilient casing and a semirigid annulus. The annulus consists preferably of circumferential steel wires 29 that are integrated by a rubberized reinforced fabric 30. The casing which is esentially flat in cross section is made by wrapping or winding a rubberized reinforcing fabric 31 cross wise or spirally about the cross section of the semirigid reinforcing annulus 28 so that the fabric will adhere to the radially-outer surface of the semi-rigid annulus but will not adhere to the radially-inner surface of the semi-rigid annulus. To this end if necessary the radially-inner surface of the annulus 28 may have applied thereto a parting agent to prevent adherence of the wound fabric thereto. Alternately, other methods may be utilized as will presently be described. Thus, when suitable cleats and other body structure to form a cross-sectional shape substantially as in FIGURE 2 are moulded and the entire structure vulcanized, the radially-inner wall of the casing will be free of the annulus 28. Materials and molding operations are similar to those usually employed for making tire castings.

Figure 3:
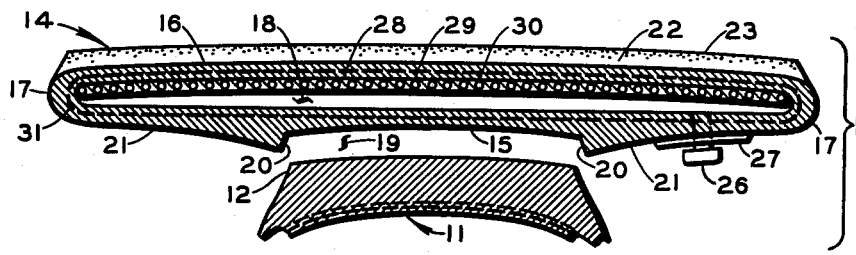
FIGURE 3 is a view of FIGURE 4 in the uninflated condition.

The overtire may be said to be made in the form of an annular chamber, flat in cross section (see FIGURES 2 and 3), having spaced annular walls 15 and 16 which are integrally joined at their edges by side portions 17. Preferably walls 15, 16, and side portions 17 are made in continuity of construction by a continuous, spirally-wound rubberized fabric 31. For clarity of drawing, fabric 31 is shown as only a single dash line in most views. However it is to be understood that several plies of rubberized fabric are intended, and additional reinforcing fabric may be added at critical stress or wear points as needed. Thus, there is formed a sealed annular cavity or chamber 18 which is adapted to receive and hold a gas, such as air, under pressure. The walls 15 and 16 are normally straight in the axial direction of the overtire. The wall 15 which is the radially-inner wall is smooth on the side facing chamber 18. On the opposite face of wall 15, a recess 19 is effectively formed by ridges or circumferential lips 20 at the edges of the recess, said ridges or lips extending radially inward. The space between the lips 20 is slightly larger than the tread portion 12 of vehicle tire 11. The portion 21 of wall 15 axially outward from lips 20 serves as a tension member to resist side thrust. A tread mass 22 projects radially outwardly from the radially-outer wall 16 and is formed by a plurality of closely spaced cleats 23 (see FIGURE 1) which extend into the side walls 17 in continuation thereof. A lug or abutment 24 (see FIGURE 2) located between one side portion 17 and lip 20 and projecting radially inwardly from wall 15 helps align the overtire when it is being installed. Additionally, abutment 24 prevents misalignment or overtire crossover during a flat tire or other sudden loss of air. In some instances as a safety measure in preventing the overtire from sliding off the casing 11 upon a flat tire, a smaller lug 25 may optionally be provided oppoiste to abutment 24. This is shown in FIGURE 2. The lug 25 has a bore or grommet 25' through which a safety cable, not shown, may be inserted. In FIGURES 1, 3, and 4, an air valve mechanism 26, mounted on reinforcement 27, and projecting through wall 15, provides a means to inject air under pressure into chamber 18.

The radially-outer wall 16 is strengthened by a reinforcing annulus 28 with circumferential steel wires 29. The primary purpose of the annulus 28 is to provide a strong radial restraint for the overtire in order to maintain the diameter of the overtire and to prevent crowning under air pressure within chamber 18 and without unduly thickening wall 16. When the average overtire is inflated, the total pressure on wall 16 runs into many thousands of pounds. Additionally, when the overtire is in operation, centrifugal force, heat, etc., further tend to radially expand wall 16. Thus the need for a strong reinforcing annulus 28 is apparent and additional purposes of the annulus 28 will hereinafter be described.

When the overtire 14 is to be mounted on the usual vehicle tire, the wheel, without deflating the tire 11, is raised from the ground in the usual manner as when changing a tire. As the innermost diameter of the annular lip 20 of the overtire 14 is made slightly larger than the periphery of the casing 11 on which the overtire is to be mounted, the overtire 14 is readily slipped on the casing 11, as shown in FIGURES 2 and 3. Air under pressure may now be introduced through valve mechanism 26 into chamber 18. It will be seen in FIGURES 2, 3, and 4 that the air pressure when applied is almost entirely against walls 15 and 16, and insignificantly against side portions 17. Therefore, wall 16 which is radially restrained will not move outwardly. However, wall 15 which is free to move radially inward as is shown diagrammatically in FIGURES 13 and 16, will firmly engage the periphery of casing 11 as shown in FIGURE 4. The overtire 14 when inflated to normal pressure will engage the entire circumference of an average size automobile tire with a force well in excess of 10,000 lbs. Thus there will be not rotational slippage between tire 11 and overtire 14. Releasing the air through valve mechanism 26 permits wall 15 to move radially outward so that the tire is easily and quickly removed when the wheel has been jacked up.

The construction and operation of a typical overtire has been described. Various features, alternate designs, and construction details will now be analyzed:

The overtire of the present invention lends itself well to low cost production. FIGURES 8, 9, 10, and 11 show in detached form the principle structural components of the overtire 14. All surfaces may be considered bonded or vulcanized together into one integral unit, except for the surfaces marked with the initials "P.L.," which stand for "parting line." In FIGURE 8, the semi-rigid reinforcing annulus 28, previously described, is tightly wrapped with rubberized fabric 31. The use of adhesive or bonding agents is omitted from the radially-inner surface of the annulus 28, and if necessary, a parting agent is used so that they will not bond together. FIGURE 9 shows the overtire after inflation and shows the split parting line P.L. FIGURE 10 illustrates a modified form of construction with an added rubber lining 32, which might also be described as an integral "inner tube" and which will aid in air retention together with an integral parting line P.L. In FIGURE 11 an alternate manner of winding rubberized fabric 31 tightly about a modified form of construction, in this case internal abutments 43, is shown, the function of which will be presently described.

To understand the principles of operation of the "overtire" refer first to FIGURE 13 where it will be noted that as the air pressure denoted by arrows P increases, the tension in wall 15, denoted by arrow T, also increases showing that the overtire is stably mounted and free of side play as portions 21 of wall 15 are quite taut. Further, when side thrust, denoted by the arrow S.T., is applied to the overtire, it is also transmitted into wall 15 as a tension force which force is then transferred by friction and by the opposite lip 20 into the tread portion 12 of tire 11. The schematic force diagram of FIGURE 12 dramatically illustrates how the semi-rigid annulus 28, shown here in cross section, axially resists by compression C the large tension forces T exerted by the rubberized fabric 31. By encompassing the annulus 28, the fabric 31 cannot be torn free of it even under the most severe loads. Furthermore, this type of construction, that is, leading the fabric from the outside rather than the inside of annulus 28, allows the least severe bending radius of the fabric 31 in the side portions 17 and also allows the smallest and therefore the most efficient angle between the annulus 28 and fabric 31. To put it another way, when side thrust is applied to an overtire, as in FIGURE 13, the tension force in the fabric 31 of wall portion 21 varies directly as the secant of the angle between wall portion 21 and the annulus 28. Thus the small angle inherent to the present invention is very efficient.

A prime requirement for a successful overtire is the ability to meet axial load or side thrust. The semi-rigid annulus 28 is essential for this function, which will now be more fully described: The annulus 28 is substantially a straight line in cross section, and it is a section of a cylinder when taken as an entity by itself. Therefore, when a transverse or axial load is applied to annulus 28 adjacent to the point of contact with the road surface, as indicated by the arrow S.T. in FIGURES 14 and 15, the annulus 28 acts as a monocoque or stressed-skin structure and sets up lines of resisting forces, indicated by the tension arrows T, so as to distribute the load over a wide area. As a result, the overtire 14 cannot be dislodged locally from tire 11 but may only be removed simultaneously over a large portion of casing 11. Since the lip 20 grips the casing over the entire circumference thereof, it would be virtually impossible to tear the overtire 14 loose from said casing 11 by a transverse load applied on tire 14 during a skidding action of the vehicle.

As has been previously explained, side thrust is transmitted from the radially-outer wall 16 to the radially-inner wall 15 by tension through portion 21 of wall 15. Additionally, in a modified form of construction, side thrust may also be transmitted by the use of internal abutments as shown in FIGURE 5. The top portion of FIGURE 5 shows a modification in which the wall 16A is provided with an annular projection 33, projecting into chamber 18, said projection forming annular shoulders 34 adapted to engage with the annular shoulders or abutments 35 of annular projection 43, projecting into chamber 18 from wall 15A, thus limiting the distance of lateral movement between walls 15A and 16A when side thrust is applied to the overtire 14A. The arrows L at the bottom of FIGURE 5 denote severe road load with a component of side thrust, as when a vehicle is severely cornering or skidding.

In FIGURES 5 and 6, overtire 14A shows another modification whereby the circumferential lips 20 of overtire 14 are replaced by intermittently spaced lip segments or abutments 36 and 37, abutment 36 being the smaller of the two to allow for easy overtire installation. FIGURE 22 shows similar intermittent abutments 36H and 37H attached to wall 15H of overtire 14H.

FIGURE 7 shows a modified overtire 14B with modified circumferential lips 20B extending radially inwardly from wall 15B to adapt the overtire to a round or streamlined tire 11B as might be used on an airplane.

FIGURE 17A illustrates a modified overtire 14C shown here in the uninflated condition. Overtire 14C is constructed in the manner heretofore described for overtire 14 but in the final stages of construction air is injected while the tire is in a suitable mold. The air forces wall 15C against the mold so that it is formed in the shape shown. The overtire 14C is then tempered and cured to remain in this position. Additional circumferential lips 20C may be added as desired. FIGURE 17B shows the inflated version of the overtire 14C.

FIGURE 18A shows a modified overtire 14D in the uninflated condition. The usual circumferential lips 20 have been dispensed with in favor of a centrally-spaced annular ridge 38 on the radially-inner face of wall 15D, said ridge 38 fitting into a mating groove 39 in the tread 12D of tire 11D. Wall 15D is thickened at 40 so that the wall conforms to the contour of tread 12D and also so that wall 15D is reinforced at a critical flexing point. FIGURE 18B shows the overtire 14D in the inflated condition.

FIGURE 19 illustrates an inflated overtire 14E, similar to 14D, but with a plurality of annular rings 38E mating with grooves 39E in tread 12E of tire 11E.

FIGURE 20 shows a modified overtire 14F with another form of internal abutments. The wall 16F is provided with annular projections 33F, projecting into chamber 18, said projections forming annular shoulders 34F adapted to engage with the annular shoulders or abutments 35F projecting into chamber 18 from wall 15F, thus limiting the distance of lateral movement between walls 15F and 16F when side thrust is applied to the overtire 14F. The arrows L at the bottom of FIGURE 20 denote severe road load with a component of side thrust, as when a vehicle is severely cornering or skidding.

FIGURE 21 shows still another modified overtire 14G, similar to overtire 14F, but with a plurality of annular projections 33G extending into chamber 18 from wall 16G and having shoulders or abutments 34G to engage similar shoulders or abutments 35G on annular projections 43G extending from wall 15G into chamber 18, so as to resist side thrust under heavy load.

The relatively wide overtire 14 and several variations have been representatively described herein. Accordingly, it will be seen that the tire has several advantages among which are ease and low cost of manufacture, extreme ease of installation and removal, and great ability to resist side thrust.

I claim:

1. In combination with an inflatable hoop-shaped member, a wide tread supplemental overtire adapted to be pneumatically mounted on said hoop-shaped member comprising an annular resilient casing having an annular chamber therein, said casing comprising a fabric reinforced lining, said casing in cross section having a substantially straight radially-outer wall and a substantially straight radially-inner wall, said walls jointed at their axially-outer extremities, said radially-outer wall having circumferentially extending reinforcements spaced across the entire width and on the radially-inner surface thereof and traction means on the radially-outer surface thereof, a central portion of said radially-inner wall being adapted to engage upon overtire inflation the periphery of said hoop-shaped member, circumferentially extending ridge means extending radially inwardly from said radially-inner wall, said ridge means having faces thereof for engaging the said member to prevent axial shift between said overtire and said member when said overtire is inflated, said radially-inner wall when said overtire is uninflated having a diameter slightly larger than the diameter of said member, whereby said overtire may be slipped on to said member without deflating the latter, said radially-inner wall having substantially greater resiliency than the said radially-outer wall, and means for introducing air under pressure into said chamber to inflate said overtire, said air pressure pressing radially inwardly said radially-inner wall to firmly engage the periphery of said member, the axial-outer portions of the radially-inner wall rotating radially inwardly about a point at the axially-outer extremity of the overtire upon said overtire inflation, and said radially-inner wall retracting radially outwardly upon release of said air pressure to permit easy removal of said overtire.

2. The structure as defined in claim 1 wherein the supplemental overtire includes means for transmitting side thrust from said radially-outer wall to said radially-inner wall, said means comprising circumferential ridges projecting inwardly into said chamber from said radially-inner wall and similar circumferential ridge or ridges projecting inwardly into said chamber from said radially-outer wall, the side shoulders of said ridges abutting upon axial loads being applied to said overtire.

3. The structure according to claim 1 wherein said radially-outer wall and said radially-inner wall in cross section are an integral, flattened tubular structure and said wire reinforcement of the radially-outer wall comprises an annulus with circumferential wires therein located on the radially-inner face of said radially-outer wall.

4. The structure according to claim 1 wherein said ridge portions are located axially apart to form a recess adapted to receive the periphery of said member, said recess having shoulder portions for engagement with the peripheral side portions of said member.

5. The structure according to claim 1 wherein said ridge portions on the radially-inner surface of the radially-inner wall engage with complemental groove portions on the periphery of said member upon overtire inflation.

6. The structure according to claim 1 wherein said annular chamber in cross section is circumscribed with an integral rubber lining.

7. The structure according to claim 1 wherein abutments are provided on one side of said overtire, said abutments mounted on said radially-inner surface of said radially-inner wall, said abutments intermittently spaced about the circumference of said overtire and located adjacent to or abutting said member, said abutments having a mean inner diameter smaller than the diameter of said member in order to facilitate said overtire installation and to prevent said overtire cross over during sudden loss of air pressure.

8. A wide tread supplemental overtire adapted to be pneumatically mounted on a vehicle tire comprising an annular resilient casing of rubberized reinforcing fabric, said casing having an annular chamber therein and being substantially flat in cross section with a substantially straight radially-outer wall and a substantially straight radially-inner wall, said walls joined together at their axial extremities by side portions of said casing, said side portions forming the apex of a substantially zero degree angle between the said walls when the overtire is in the uninflated condition, said radially-outer wall comprising axial and circumferential wire and fabric reinforcements to provide a semirigid structure to retain the shape of the overtire under radial and axial loads, said radially-inner wall having substantially greater resiliency than said radially-outer wall, and means for introducing air under pressure into said chamber to inflate said overtire, said air pressure forcing the said radially-inner wall radially inwardly to firmly engage the periphrey of a vehicle tire when mounted thereon, said side portions forming the apex of a small acute angle between the said walls when the overtire is in the inflated condition, said radially-outer wall having cleats for road traction on the radially-outer surface therof, said radially-inner wall having ridge means on the radially-inner surface to engage the periphery of the said vehicle tire to prevent axial shift, said ridge means having a diameter substantially equal to the diameter of said vehicle tire when the overtire is uninflated, to permit easy removal of said overtire.

9. A supplemental overtire according to claim 8 including means for transmitting side thrust from said radially-outer wall to said radially-inner wall, said means comprising circumferential ridges projecting inwardly into said chamber from said radially-inner wall and similar circumferential ridge or ridges projecting inwardly into said chamber from said radially-outer wall, the side shoulders of said ridges abutting upon axial loads being applied to said overtire.

10. A supplimental overtire as in claim 8 wherein said radially-outer wall and said radially-inner wall in cross section are an integral, flattened tubular structure and said wire reinforcement of the radially-outer wall comprises an annulus with circumferential wires therein located on the radially-inner face of said radially-outer wall.

11. A supplemental overtire as in claim 8 wherein said ridge portions are located axially apart to form a recess adaptable to receive the periphery of said vehicle tire, said recess having shoulder portions for engaging with the peripheral side portions of said vehicle tire.

12. A supplemental overtire as in claim 8 wherein said ridge portions on the radially-inner surface of the radially-inner wall engage with a complemental groove portion on the periphrey of said vehicle tire upon overtire inflation.

13. A supplemental overtire as in claim 8 wherein said annular chamber in cross section is circumscribed with an integral rubber lining.

14. A supplemental overtire as in claim 8 wherein abutments are provided on one side of said overtire, said abutments mounted on said radially-inner surface of said radially-inner wall, said abutments intermittently spaced about the circumference of said overtire and located adjacent to or abutting said vehicle tire, said abutments having a mean inner diameter smaller than the diameter of said vehicle tire in order to facilitate said overtire installation and to prevent said overtire crossover during sudden loss of air pressure.

15. A wide tread supplemental overtire adapted to be pneumatically mounted on a vehicle tire comprising a relatively wide semi-rigid circular band, said band constructed of rubberized fabric and wire material, said band being substantially straight in cross section, an annular resilient casing having an annular chamber, said casing formed of rubberized reinforcing fabric wound crosswise about said semi-rigid band, said fabric adhering to the radially-outer surface of said band and lying adjacent and free of the radially inner surface of said band, said casing having traction cleats on the radially-outer surface and circumferential ridge portions on the radially-inner surface, said ridge portions having a diameter substantially equal to the diameter of the vehicle tire, said ridge portions adapted to engage said vehicle tire upon said overtire inflation to prevent axial shift between said overtire and said vehicle tire, the radially-inner wall of said casing having substantially greater resiliency than the radially-outer wall of said casing, said semi-rigid band being sufficiently reinforced axially with said rubberized fabric to resist by axial compression the tension of said radially-inner wall of said casing when said overtire is inflated, and means for introducing air under pressure into said chamber to inflate said overtire, said air pressure forcing radially inwardly the said radially-inner wall to firmly engage the periphery of said vehicle tire, said radially-inner wall returning to a position adjacent to the said band upon release of said air pressure to permit easy removal of said overtire.

16. A supplemental overtire according to claim 15 including means for transmitting side thrust from said radially-outer wall to said radially-inner wall, said means comprising circumferential ridges projecting inwardly into said chamber from said radially-inner wall and similar circumferential ridge or ridges projecting inwardly into said chamber from said radially-outer wall, the side shoulders of said ridges abutting upon axial loads being applied to said overtire.

17. A supplemental overtire as in claim 15 wherein said radially-outer wall and said radially-inner wall in cross section are an integral, flattened tubular structure and said wire reinforcement of the radially-outer wall comprises an annulus with circumferential wires therein located on the radially-inner face of said radially-outer wall.

18. A supplemental overtire as in claim 15 wherein said ridge portions are located axially apart to form a recess adapted to receive the periphery of said vehicle tire, said recess having shoulder portions for engagement with the peripheral side portions of said vehicle tire.

19. A supplemental overtire as in claim 15 wherein said ridge portions on the radially-inner surface of the radially-inner wall engage with complemental groove portions on the periphery of said vehicle tire upon overtire inflation.

20. A supplemental overtire as in claim 15 wherein said annular chamber in cross section is circumscribed with an integral rubber lining.

21. A supplemental overtire as in claim 15 wherein abutments are provided on one side of said overtire, said abutments mounted on said radially-inner surface of said radially-inner wall, said abutments intermittently spaced about the circumference of said overtire and located adjacent to or abutting said vehicle tire, said abutments having a means inner diameter smaller than the diameter of said vehicle tire in order to facilitate said overtire installation and to prevent said overtire crossover during sudden loss of air pressure.

References Cited in the file of this patent

UNITED STATES PATENTS

| | | |
|---|---|---|
| 1,989,402 | Cupp | Jan. 29, 1935 |
| 2,365,279 | Kraft | Dec. 19, 1944 |
| 2,735,471 | McLean | Feb. 21, 1956 |
| 2,874,742 | Lugli | Feb. 24, 1959 |
| 2,950,751 | Bolster et al. | Aug. 30, 1960 |